June 7, 1966 M. PERLMAN 3,254,669
SINGLE LEVER VALVE WITH TEMPERATURE INDICATOR
Filed Dec. 6, 1963 2 Sheets-Sheet 1

INVENTOR.
MILTON PERLMAN
ATTORNEYS

June 7, 1966  M. PERLMAN  3,254,669
SINGLE LEVER VALVE WITH TEMPERATURE INDICATOR
Filed Dec. 6, 1963  2 Sheets-Sheet 2
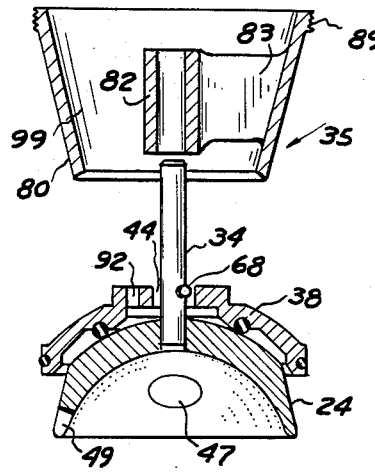
FIG. 3
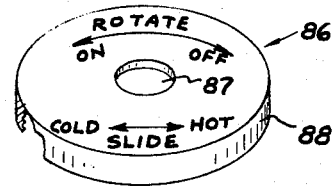
FIG. 4
FIG. 5
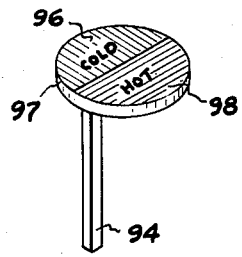
FIG. 6
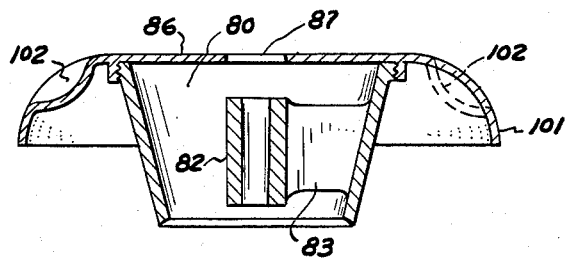
INVENTOR.
MILTON PERLMAN
BY
ATTORNEYS

United States Patent Office 3,254,669
Patented June 7, 1966

3,254,669
SINGLE LEVER VALVE WITH TEMPERATURE INDICATOR
Milton Perlman, 12085 Dixie St., Detroit, Mich. 48239
Filed Dec. 6, 1963, Ser. No. 328,649
2 Claims. (Cl. 137—556)

This application, a continuation-in-part of my prior application, Ser. No. 312,424 of September 30, 1963, relates to single lever valves for use in outletting desirable mixtures of hot and cold water as desired, both as to temperature and quantity or volume, all accomplished by the use of a single lever or stem, and delivering or outletting through a single port or spout.

The valve hereof is characterized by several outstanding features.

It is extremely simple of construction resulting in reduced cost of manufacture, installation and maintenance, and permitting servicing by even a rather unskilled householder.

It may be pre-adjusted as to temperature; it may be turned off at any desired temperature setting, and thus turned on again at the same temperature setting.

It is so designed that the tolerances required are reduced to a minimum.

It also includes a novel form of indicator and handle which can be added to the stem of the valve to provide a novel form of manual control, particularly one which indicates the temperature setting of the valve.

Inasmuch as the indicator and handle here have a novel and special coaction with the valve of my prior application, I incorporate by reference into this application all of the disclosure of my prior application, it being understood that all parts disclosed in the prior application are to be considered as if disclosed here, with certain parts being disclosed more briefly here for purposes of conciseness.

For an understanding of the valve hereof, reference should be had to the appended drawings which show a preferred embodiment.

In these drawings:

FIG. 3 shows a handle part per se, with associated parts.

FIG. 4 shows a handle cover per se.

FIG. 5 shows an indicator plate or flag per se.

FIG. 6 shows a modification in fragmentary view.

Figure 1:
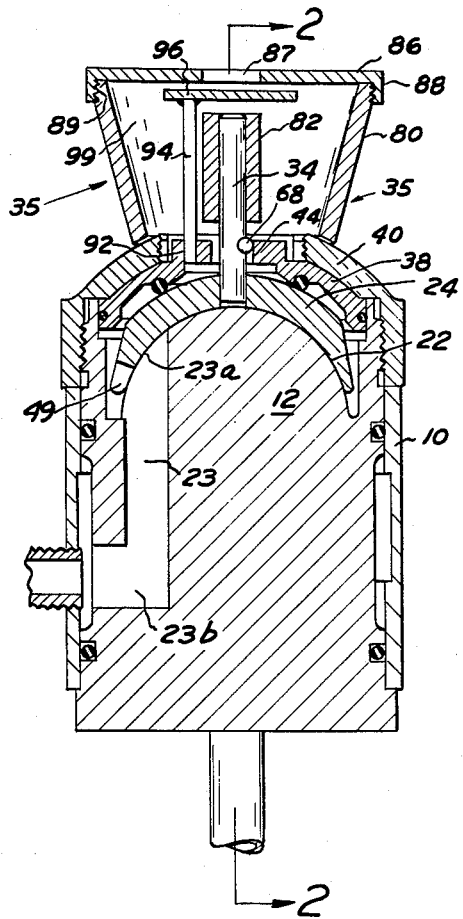
FIG. 1 is a view in vertical cross-section of the assembled valve.
Figure 2:
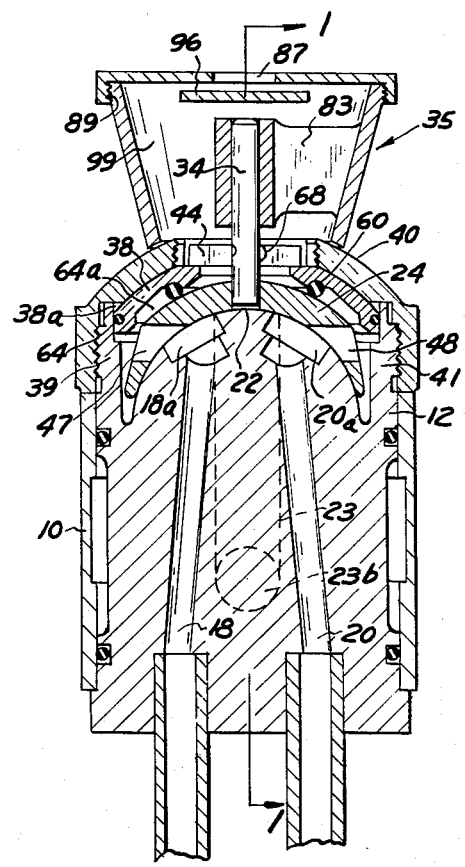
FIG. 2 is a section view of the valve, as if on line 2—2 of FIG. 1.

The valve hereof comprises a cylindrical shell 10 surrounding a cylindrical body or core 12. Vertical inlet bores 18 and 20, respectively, adapted to be connected at their lower ends to hot and cold water inlet lines, open into the dome-shaped rounded convexed upper end or valve seat 22 of the body 12, and provide inlet ports 18a and 20a. A third bore 23, for outletting, also opens to seat 22 of the body. Outlet bore 23 thus provides an outlet port 23a in seat 22. Bore 23 opens to a transverse horizontal part or bore 23b which is the outlet of the valve.

Against seat 22 of body 12 a concaved valve member 24 is seated to shift forwardly and rearwardly. From its upper convex surface upwardly extends a central stem 34 surmounted by a removable hand grip 35 later to be described in detail.

Above valve member 24 is a dished sealing plate 38 whose outer edge 38a seals to an annular zone 39 of body 12. Above sealing plate 38 is a domed hold-down cap 40 threaded onto a skirt 41 of body 12.

Stem 34 moves forwardly and back in a north-south path defined by an elongated slot 44 of sealing plate 38.

Valve member 24 has inlet openings 47-48 and an outlet opening 49. Their location determines relative communication among ports 18a, 20a, and 23a.

Mixing chamber

Sealing plate 38 has a sealing ring 60 surrounding stem 34 which seals against the upper surface of valve member 24. Edge 38a of sealing plate 38 has a sealing ring 64 for sealing to annular zone 39 of the body as shown. Thus, a sealed mixing chamber 64a is formed to communicate through valve member openings 47-48-49 to the three ports of seat 22 and provides a sealed mixing chamber of rather large size and volume and above valve member 24 itself, and sealed from slot 44 of sealing plate 38.

For limiting axial rotation or twisting of stem 34 in slot 44 of sealing plate 38, effected by handle 35 on stem 34, there is provided a transverse limit pin 68 fixed to stem 34 which engages the sides of slot 44 to limit axial rotation of stem 34 to about 60°, all that is necessary in the embodiment shown for moving outlet opening or notch 49 of valve member 24 from full open to full closed position relative to the upper end of outlet port 23a.

Assembly and operation

The device is assembled and operated as follows:

First, core or body 12 and shell 10 are assembled as a sub-assembly.

Thereafter valve member 24 is set down on seat 22 with stem 34 vertical and with notch 49 overlying port 23a and with holes 47-48 of valve member 24 being alined with ports 18a-20a as viewed from above.

With the parts thus alined, sealing plate 38 is then placed on valve member 24 with slot 44 being alined with holes 47-48 of valve member 24 and inlet ports 18a-20a.

Then hold-down cap 40 is threaded down over the parts while they are held in the previously described position and the assembly is completed.

Stem 34 is movable in a north-south path coinciding with the north-south axis of cap holes 47-48 and ports 18a-20a and body inlet as distinguished from the position of port 23a and valve member notch 49 which is west.

Transverse pin 68 of stem 34 will now be engaging a side of slot 44 to limit axial twisting of stem 34 approximately 60° to cover the range of opening provided by the upper end of port 23a, limiting being effected by the engagement of pin 68 with the sides of slot 44 in sealing plate 38.

Operation

For temperature adjustment, stem 34 is shifted north and south. For volume adjustment, stem 34 is rotated axially in whatever position it may happen to be at the moment relative to the ends of slot 44 in sealing plate 38. Thus flow may be shut off at any desired temperature and this presets the valve so that when the valve is once again turned on, by rotating stem 44 axially once more, such rotation may be effected and the valve may be opened at the pre-set temperature determined by the position of stem 34 in slot 44 as previously adjusted.

Temperature indication

In this application I also disclose a novel form of handle and indicator to be applied to the valve. The novel elements are those disclosed in FIGS. 3, 4, 5 and 6 separately and these elements will now be described in detail.

FIG. 3 shows handle 35 as comprising a large diameter shell 80 containing a hollow central sleeve 82 connected by a wing 83 to the outside of the shell 80, all of these parts being integral. Sleeve 82 is of a length and diameter to receive stem 34 of the valve tightly and firmly, with a press fit.

Threaded on and surmounting shell 80 as shown is a cover 86 having a view opening or hole 87 and a flange 88, the latter being threaded onto the upper circular edge 89 of the shell 80. With parts 86 and 80 so interconnected, there is provided a conveniently shaped handle for manipulating stem 34 and valve member 24, moving these parts left and right or rotating them as desired and being of a size and shape convenient for manipulation by the fingers of the user.

While in some instances the shell 80 may be used as the hand grip, essentially it is the outer rim of the cover 86 that forms the hand grip because in most instances the handle will be rotated by the fingertips of the user. The shell 80 serves functionally more as an enclosure for the indicator or flag 96 now to be described as well as a support or the mounting for the hand grip part.

Indicator

The sealing plate 38 of the valve is formed with a small hole 92 in which is press fitted the lower end of a stem 94 surmounted by and connected to an indicator plate or flag 96 having the left side of its top surface colored blue as shown at 97 and marked "COLD" and its right side portion 98 colored red and marked "HOT." Stem 94 projects up through shell 80 in a passageway 99 and plate 98 overlies sleeve 82 and is contained within the cover 86 so that plate 96 is exposed through opening 87 of cover 86, the latter being closed, if desired, by a transparent shield through which may be viewed whatever part 97 or 98 of plate 96 happens to be in register with opening 87 as the latter is shifted left and right.

It will be observed that as handle 35 is moved left and right it will expose proportionate parts of blue "COLD" portion 96 or red "HOT" portion 98 of flag 96 to indicate the position of handle 35, stem 34 and valve member 24 with respect to the inlet and outlet ports of the valve and thus indicate the temperature setting.

This indication is affected in no way by the rotation of handle 35 for rotation of stem 34 for controlling volume.

While in the preferred embodiment the diameter of shell 80 is approximately two inches, it may be preferred, for purposes of ornamentation and shielding, to form cover 86 with an extending flange or skirt 101 substantially as shown in FIG. 6 by which cover 86 is made saucer shaped and with such flange extending the diameter substantially. This will provide a shield over all of the valve parts to enhance the appearance of the valve and also to reduce the possibility of injury due to impact with any edge of any projecting part of the valve particularly desirable where the valve is used on a vertical wall of a shower with the valve projecting horizontally from such wall.

In such case the large diameter shield 101, eliminating all sharp corners, will serve to prevent any possible injury due to a person striking or making contact with a sharp edge of the valve or the valve handle.

To facilitate rotation of cover 86 as skirted at 101, finger grips 102 may be formed in skirt 101 as shown.

Flag or indicator plate 96 in the specific valve construction hereof has a special and unique functions. It serves to indicate a preset temperature, a temperature at which the valve can be turned off, as for example, when a user has finished his shower. Then when the user wishes to turn the valve on, he can look at the indicator and know in advance that when he turns on the water it will be proportioned to the temperature not only as he left it on the previous shower, if he remembers that, but also as he now observes it in the indicator or flag which is clearly visible to him at the moment. In other words, the indicator serves as a guide to inform the user not only what the temperature setting is but more important what the water temperature will be as soon as he turns the water on. In this way, he can prevent himself from being scalded or alternatively chilled when he enters the shower and attempts to determine a desired setting.

This special coaction of the indicator with the valve hereof arises from the fact that movement of stem 34 for controlling temperature is independent of movement of stem 34 for controlling volume and that volume may be shut off or turned on without disturbing a previously determined temperature position or setting of the valve stem. Since the position of the valve stem determines the position of the view opening of the handle, the view of the stationary indicator flag or plate 96 provides a guide to the user before he turns the valve on.

Now having described the valve construction herein disclosed, reference should be had to the claims which follow.

I claim:
1. In a single lever valve provided with a body having two inlet ports and an outlet port, a valve member for said ports provided with an operating stem and movable side to side and around its axis rotatably by corresponding movement of said stem for proportionately mixing inlet flow from the two inlet ports controlled by said valve member and for controlling outlet flow to the outlet port; and a cap over said body;

in such a valve:

means for moving the stem side to side and for rotating it and for indicating the inlet flow proportioning comprising a sleeve fitted tightly over said stem and surrounding it; a large diameter hand grip concentric with said sleeve but remotely spaced annularly from it but connected integrally to it; and a cover overlying said hand grip and removably secured to it; said valve also having a wide indicator plate under said cover and a stem therefor secured in a stationary part of the valve for mounting said indicator plate; the cover having a small view opening exposing that part of the indicator plate with which the view opening happens to register; the first stem and the sleeve being under and spaced from said cover; with the indicator being in the space thus provided, and with the second stem being laterally spaced from the first stem and sleeve.

2. A valve according to claim 1, wherein the hand grip is of cylindrical shell form and extends from the cover to the cap of the valve.

References Cited by the Examiner
UNITED STATES PATENTS

| | | | |
|---|---|---|---|
| 828,434 | 8/1906 | Stahl | 116—125 |
| 1,661,431 | 3/1928 | Leibing | 137—625.41 X |
| 3,159,181 | 12/1964 | Harke | 137—625.4 |

M. CARY NELSON, *Primary Examiner.*

HENRY T. KLINKSIEK, *Examiner.*